US007818473B2

(12) United States Patent
Candelaria et al.

(10) Patent No.: US 7,818,473 B2
(45) Date of Patent: Oct. 19, 2010

(54) EMBEDDED LOCATE RECORDS FOR DEVICE COMMAND WORD PROCESSING

(75) Inventors: Susan Kay Candelaria, Tucson, AZ (US); Matthew Joseph Kalos, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/189,582

(22) Filed: Aug. 11, 2008

(65) Prior Publication Data

US 2010/0036978 A1    Feb. 11, 2010

(51) Int. Cl.
*G06F 13/28* (2006.01)
(52) U.S. Cl. ........................................ 710/24; 370/464
(58) Field of Classification Search ................. 710/24
See application file for complete search history.

(56) References Cited

U.S. PATENT DOCUMENTS

| 4,415,970 | A | 11/1983 | Swenson et al. |
| 4,862,411 | A | 8/1989 | Dishon et al. |
| 5,978,890 | A | 11/1999 | Ozawa et al. |
| 6,470,432 | B2 | 10/2002 | Ozawa et al. |
| 6,515,715 | B1 * | 2/2003 | Essen et al. ................. 348/714 |
| 7,103,750 | B2 * | 9/2006 | Helsley et al. ............. 711/217 |
| 7,324,519 | B2 * | 1/2008 | Montuno et al. ........... 370/392 |
| 2007/0061463 | A1 * | 3/2007 | Hiramatsu et al. ......... 709/226 |
| 2008/0082496 | A1 * | 4/2008 | Kalos et al. .................... 707/3 |

* cited by examiner

*Primary Examiner*—Henry W Tsai
*Assistant Examiner*—Elias Mamo
(74) *Attorney, Agent, or Firm*—Griffiths & Seaton PLLC

(57) ABSTRACT

A method of packaging locate record commands for device command word (DCW) processing is provided. A first locate record command is packaged into DCW prefix parameter data. The first locate record command includes first search and first seek arguments, a first intent count argument, a first transfer length factor argument, and a plurality of remaining arguments. A plurality of truncated locate record commands is embedded in the DCW prefix parameter data as concatenations to the first locate record command. Each of the plurality of truncated locate record commands include a unique search argument, intent count argument, and transfer length factor argument. Seek argument parameters for each of the plurality of truncated locate record commands are calculated by taking an offset from the first seek argument and the first search argument, applying the offset to each of the plurality of truncated locate record commands. The plurality of remaining arguments is shared.

17 Claims, 2 Drawing Sheets

EMBEDDED LOCATE RECORDS FOR DEVICE COMMAND WORD PROCESSING

BACKGROUND OF THE INVENTION

1. Field of the Invention

The present invention relates in general to computers, and more particularly to a mechanism for packaging locate record commands for device command word (DCW) processing.

2. Description of the Related Art

Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a control unit, the control unit being further coupled to one or more input/output devices.

The channel subsystem employs channel command words to transfer data between the input/output devices and memory. A channel command word (CCW) specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity, to a control unit (processor) coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing.

SUMMARY OF THE INVENTION

Processing environments incorporating CCWs have traditionally used unique protocols to transport the CCWs to a control unit. More recent improvements to I/O architectures have featured fibre channel protocols (FCP) for transmitting device command words (DCWs) to a control unit. DCWs may be employed in a channel command word descriptor (CCWD) denoting the multiple commands to be executed by the control unit. The commands are executed independent of the channel, in that status relative to execution of the individual commands is not tracked by the channel. The control unit receives the multiple commands as a single information unit (IU) and has the responsibility of executing the commands in an appropriate manner. By relieving the channel of the responsibility of tracking individual commands, the performance of the channel is significantly enhanced.

A major difference between the traditional and newer protocols is that chains of CCW commands may be extremely large. Indeed, the chains may be never ending by allowing software to dynamically add to a running CCW chain. In contrast, the transport layer in DCW type processing is limited in size.

Many extended count key data (ECKD) channel programs operate on discontiguous sets of tracks by using multiple "Locate Record" domains. A locate record domain normally specifies a contiguous set of records or tracks to operate on. Locate record commands may also specify a bitmap of tracks (16) to operate on. In one embodiment, a DCW may contain a locate record command repackaged into a prefix (PFX) command, including parameter data within the PFX command. Using this format, the number of locate record commands that may be encapsulated in an IU for a DCW type protocol is limited. Accordingly, a need exists for a mechanism to efficiently package a greater number of locate record commands in the limited space offered by DCW protocols.

In light of the foregoing, in one embodiment, by way of example only, a method of packaging locate record commands for device command word (DCW) processing in a computer environment having an I/O link handling complex instruction chains for a processing operation is provided. A first locate record command is packaged into DCW prefix parameter data. The first locate record command includes first search and first seek arguments, a first intent count argument, a first transfer length factor argument, and a plurality of remaining arguments. A plurality of truncated locate record commands is embedded in the DCW prefix parameter data as concatenations to the first locate record command. Each of the plurality of truncated locate record commands include a unique search argument, intent count argument, and transfer length factor argument. Seek argument parameters for each of the plurality of truncated locate record commands are calculated by taking an offset from the first seek argument and the first search argument, applying the offset to each of the plurality of truncated locate record commands. The plurality of remaining arguments are shared between the first locate record command and the plurality of truncated locate record commands.

In an additional embodiment, again by way of example only, a system of packaging locate record commands for device command word (DCW) processing in a computer environment having an I/O link handling complex instruction chains for a processing operation is provided. An initiator processor is in communication with a control unit in the computer environment. The initiator processor is adapted to package a first locate record command into DCW prefix parameter data. The first locate record command includes first search and first seek arguments, a first intent count argument, a first transfer length factor argument, and a plurality of remaining arguments. The initiator processor is also adapted to embed a plurality of truncated locate record commands in the DCW prefix parameter data as concatenations to the first locate record command. Each of the plurality of truncated locate record commands include a unique search argument, intent count argument, and transfer length factor argument. Seek argument parameters for each of the plurality of truncated locate record commands are calculated by taking an offset from the first seek argument and the first search argument, applying the offset to each of the plurality of truncated locate record commands. The plurality of remaining arguments are shared between the first locate record command and the plurality of truncated locate record commands.

In still another embodiment, again by way of example only, a computer program product for packaging locate record commands for device command word (DCW) processing in a computer environment having an I/O link handling complex instruction chains for a processing operation is provided. The computer program product comprises a computer-readable storage medium having computer-readable program code portions stored therein. The computer-readable program code portions comprise a first executable portion for packaging a first locate record command into DCW prefix parameter data, the first locate record command including first search and first seek arguments, a first intent count argument, a first transfer length factor argument, and a plurality of remaining arguments, and a second executable portion for embedding a plurality of truncated locate record commands in the DCW prefix parameter data as concatenations to the first locate record command. Each of the plurality of truncated locate record commands include a unique search argument, intent count argument, and transfer length factor argument. Seek argument parameters for each of the plurality of truncated locate record commands are calculated by taking an offset from the first seek argument and the first search argument, applying the offset to each of the plurality of truncated locate record commands. The plurality of remaining arguments are shared between the first locate record command and the plurality of truncated locate record commands.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
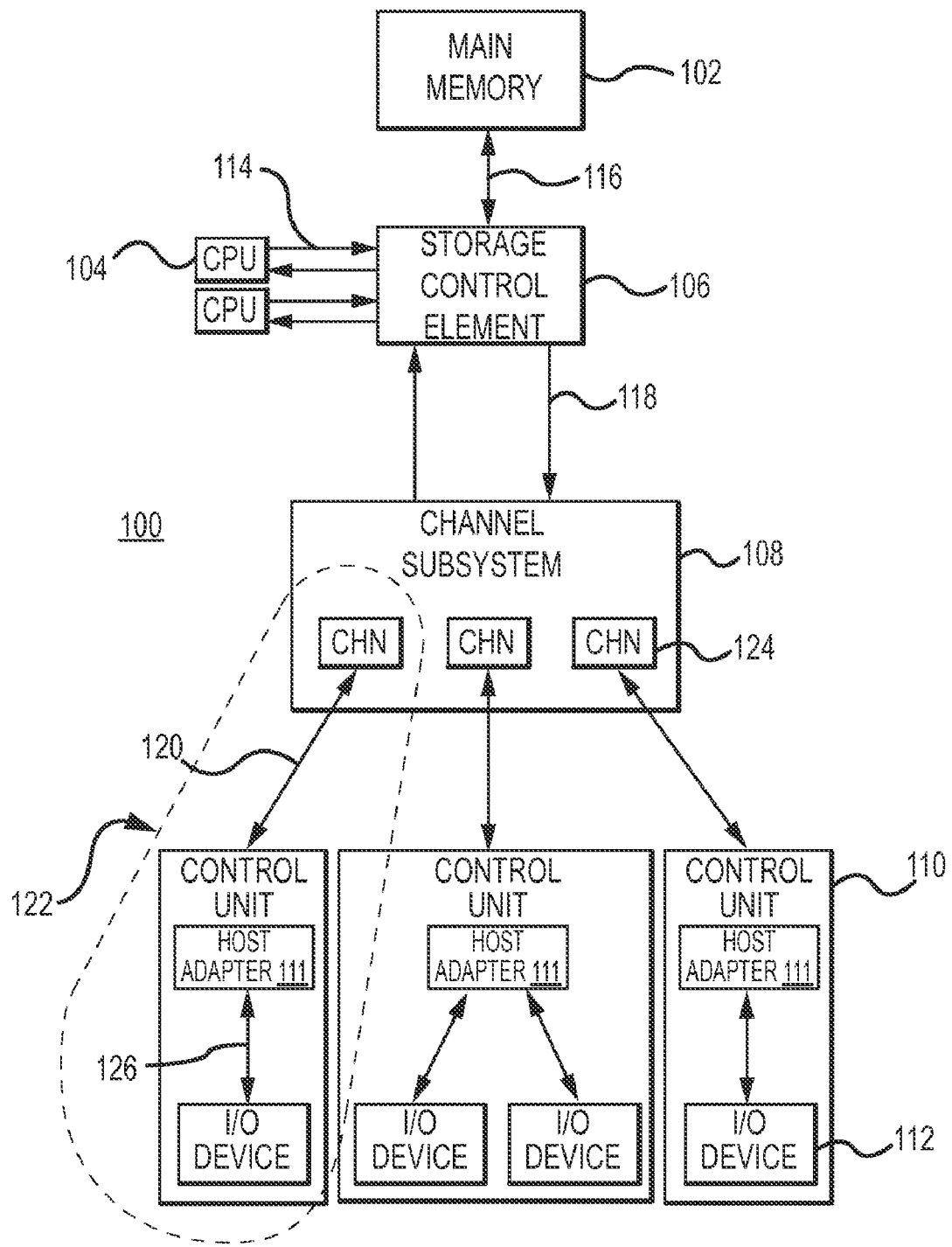
FIG. 1 depicts an exemplary processing environment incorporating and using one or more aspects of the present invention.

One example of a processing environment incorporating and using one or more aspects of the present invention is described with reference to FIG. 1. Processing environment 100 includes, for instance, a main memory 102, one or more central processing units (CPU) 104, a storage control element 106, a channel subsystem 108, one or more control units 110 and one or more input/output (I/O) devices 112, each of which is described below.

Main memory 102 stores data and programs, which are input from input devices 112. Main memory 102 is directly addressable and provides for high-speed processing of data by central processing units 104 and channel subsystem 108.

Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus.

Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108.

Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management functions of testing for channel path availability, selecting an available channel path and initiating execution of the operation with the input/output devices.

Each channel path 122 includes a channel 124 (channels are located within the channel subsystem, in one example, as shown in FIG. 1), one or more control units 110 and one or more connections 120. In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfers over the channel path and certain levels of input/output device control.

Each control unit 110 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM® z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995, which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Locate record operations are commonly used in conjunction with read and write system commands. For example, a write system command may be chained to a Define Extent and Locate Record commands. In this manner, when a single record is written to an I/O device, the channel subsystem creates and sends a DCW chain to the I/O device's control unit. The channel can repackage existing CCWs such as Define Extent (DX) and Locate Record (LR)/Locate Record Extended (LRE) into a Prefix (PFX) command. It can also package a read or write chain into a DCW. Thus the DX/LR/Write functionality is packaged into a single DCW using a PFX command.

A locate record command, in one embodiment, specifies the following information in a 16-byte field. Below, each argument is listed accompanied by its respective size:

1 byte LR Operation
1 byte flags
1 byte embedded CCW op code
1 byte intent count/repeat count
4 byte seek argument
5 byte search argument
1 byte sector number
2 bytes transfer length factor The above seek and search arguments are related to each other. The seek argument specifies a physical track. The search argument specifies a logical track number and record within the track. In most cases, the seek argument specifies the same track as the search argument. Some applications such as virtual machine operating system (VM)-based minidisks take a physical volume and carve it into smaller logical volumes to be used by guests such as z/OS guests. The guests use the minidisk volumes as if they were real CKD volumes and address count fields in the tracks starting with a logical track number zero. For purposes of the present invention, the seek and search arguments are assumed to have a constant offset value between them.

To efficiently package a number of locate record commands for DCW processing, a mechanism may be employed where a first locate record is packaged in the DCW, followed by a number of subsequent embedded truncated locate record commands. To use a minimum number of bytes for each subsequent locate record domain, only 8 bytes of the normal 16 byte locate record parameters (or 22 byte LRE parameters) are provided. The embedded locate record domains are included in the initial DCW prefix parameters as an array. The size of the array is specified in the prefix parameters, indicating the number of embedded locate records included in the prefix parameter data.

In one embodiment, each imbedded locate record parameters specify the following information in an 8-byte field. Below, each argument is listed together with its respective size:

5 byte search argument
1 byte intent count
2 byte transfer length factor

The seek argument for an embedded locate record may be calculated by taking the offset from the first seek argument and the first search argument and applying that offset to each imbedded locate record search argument. In the case of VM-type implementations, this allows for any contiguous minidisk mapping (where the minidisk is comprised of a set of contiguous real disk tracks).

The remaining arguments are all inherited without change from the arguments specified for the first locate record parameters. If one of these parameters requires changing, the DCW I/O chain may be broken into two separate requests.

Figure 2:
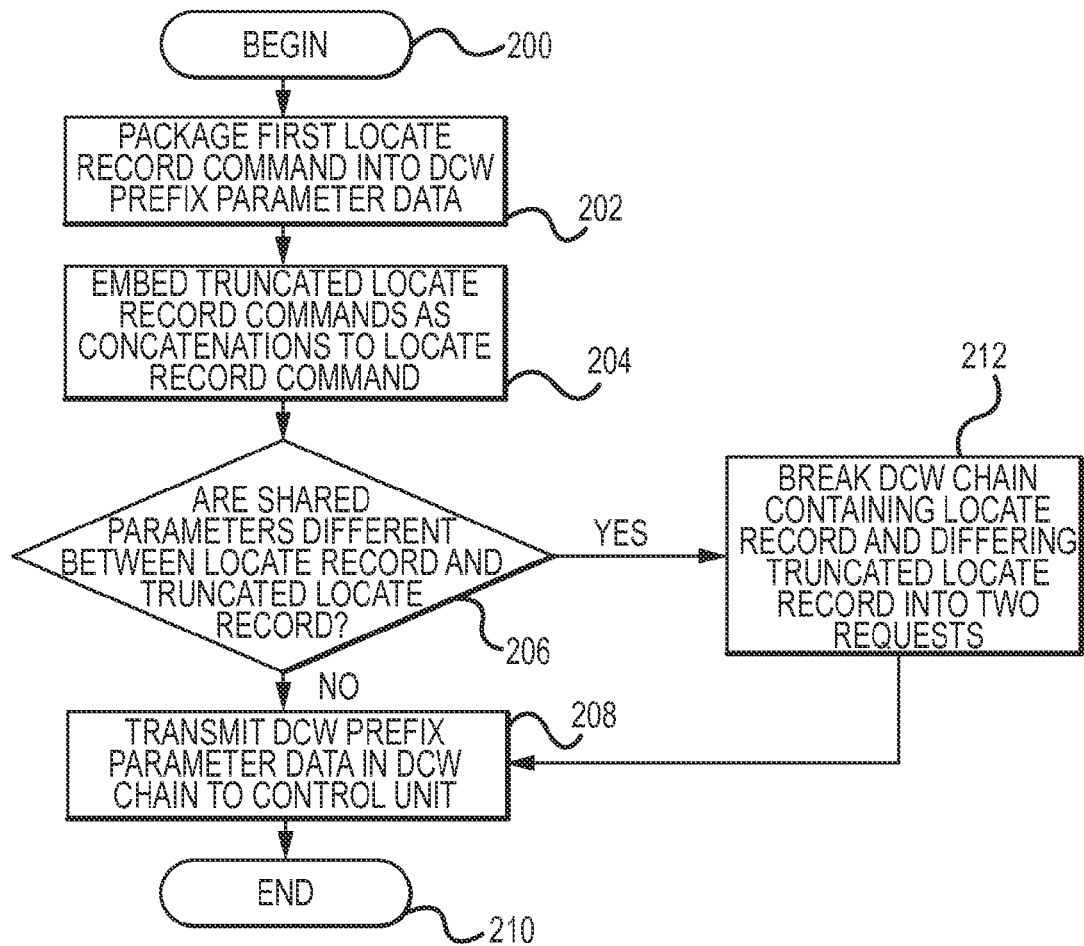
FIG. 2 depicts an exemplary method for packaging locate record commands for DCW processing.

FIG. 2, following, depicts an exemplary method for packaging a number of locate record commands for DCW processing. As one skilled in the art will appreciate, various steps in the following method may be implemented in differing ways and orders to suit a particular application. In addition, the described method may be implemented by various means, such as hardware, software, firmware, or a combination thereof operational on or otherwise associated with the processing environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

The embedded locate record processing begins (step 200) with the packaging of a first locate record information into DCW prefix parameter data (step 202). In one embodiment, the first locate record includes the 16 bytes of locate record arguments described above, including the LR Operation argument, flags argument, embedded CCW op code argument, intent count/repeat count, seek argument, search argument, sector number argument, and transfer length factor argument. The packaging may be performed by a processing device in the environment, such as an initiator processor in communication with a control unit, for example.

As a next step a number of truncated locate record information are embedded as concatenations to the first locate record information (step 204). In one embodiment, the truncated locate records each include unique truncated parameters such as the 8 byte information described above, including the search argument, intent count, and transfer length factor. As described previously, the seek argument for each subsequent embedded locate record is calculated using the offset between the seek argument and search argument of the first locate record information.

The remaining locate record parameters are shared between the first locate record information and the subsequent embedded locate record information. In the embodiment described above, the shared parameters include the LR Operation argument, flags argument, embedded CCW op code argument, and sector number argument. The embedded locate record domains are included in the initial DCW prefix parameters as an array. The size of the array is specified in the prefix parameters, indicating the number of embedded locate records included in the prefix parameter data.

If a shared parameter of the first locate record information and a subsequent locate record information need be changed for any reason (step 206), the DCW I/O chain is broken into two requests (step 212). In any event, the request(s) are transmitted in the DCW prefix parameter data in a DCW chain to the control unit for processing (step 208). The processing then ends (step 210).

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of packaging locate record commands for device command word (DCW) processing in a computer environment having an I/O link handling complex instruction chains for a processing operation, the method comprising:

packaging a first locate record command into DCW prefix parameter data, the first locate record command including first search and first seek arguments, a first intent count argument, a first transfer length factor argument, and a plurality of remaining arguments; and embedding a plurality of truncated locate record commands in the DCW prefix parameter data as concatenations to the first locate record command, wherein:

each of the plurality of truncated locate record commands include a unique search argument, intent count argument, and transfer length factor argument, seek argument parameters for each of the plurality of truncated locate record commands are calculated by taking an offset from the first seek argument and the first search argument, applying the offset to each of the plurality of truncated locate record commands, and the plurality of remaining arguments are shared between the first locate record command and the plurality of truncated locate record commands, wherein, if one of the plurality of remaining arguments of the first locate record command and one of the plurality of embedded truncated locate record commands differ, breaking an input/output (I/O) chain containing the first locate record command and the one of the plurality of embedded truncated locate record commands into two requests.

2. The method of claim 1, further including specifying a plurality of domains for each of the plurality of embedded truncated locate record commands as an array in the DCW prefix parameter data.

3. The method of claim 2, further including specifying a size of the array in the DCW prefix parameter data to indicate a number representative of the plurality of embedded truncated locate record commands.

4. The method of claim 1, wherein each of the unique search arguments are 5 bytes in length, each of the unique intent count arguments are one byte in length, and each of the unique transfer length factor arguments are two bytes in length.

5. The method of claim 1, further including transmitting the DCW prefix parameter data in a DCW chain to a control unit for processing.

6. A system of packaging locate record commands for device command word (DCW) processing in a computer environment having an I/O link handling complex instruction chains for a processing operation, the system comprising:

an initiator processor in communication with a control unit in the computer environment, the initiator processor adapted for:

packaging a first locate record command into DCW prefix parameter data, the first locate record command including first search and first seek arguments, a first intent count argument, a first transfer length factor argument, and a plurality of remaining arguments; and embedding a plurality of truncated locate record commands in the DCW prefix parameter data as concatenations to the first locate record command, wherein:

each of the plurality of truncated locate record commands include a unique search argument, intent count argument, and transfer length factor argument, seek argument parameters for each of the plurality of truncated locate record commands are calculated by taking an offset from the first seek argument and the first search argument, applying the offset to each of the plurality of truncated locate record commands, and the plurality of remaining arguments are shared between the first locate record command and the plurality of truncated locate record commands, wherein the initiator processor is further adapted for, if one of the plurality of remaining arguments of the first locate record command and one of the plurality of embedded truncated locate record commands differ, breaking an input/output (I/O) chain containing the first locate record command and the one of the plurality of embedded truncated locate record commands into two requests.

7. The system of claim 6, wherein the initiator processor is further adapted for specifying a plurality of domains for each of the plurality of embedded truncated locate record commands as an array in the DCW prefix parameter data.

8. The system of claim 7, further including wherein the initiator processor is further adapted for specifying a size of the array in the DCW prefix parameter data to indicate a number representative of the plurality of embedded truncated locate record commands.

9. The system of claim 6, wherein each of the unique search arguments are 5 bytes in length, each of the unique intent count arguments are one byte in length, and each of the unique transfer length factor arguments are two bytes in length.

10. The system of claim 6, wherein the plurality of remaining arguments include a locate record argument, a flag argument, an embedded channel command word (CCW) op code argument, and a sector number argument.

11. The system of claim 6, wherein the initiator processor is further adapted for transmitting the DCW prefix parameter data in a DCW chain to the control unit for processing.

12. A computer program product for packaging locate record commands for device command word (DCW) processing in a computer environment having an I/O link handling complex instruction chains for a processing operation, the computer program product comprising a computer-readable non-transitory storage medium having computer-readable program code portions stored therein, the computer-readable program code portions comprising:

a first executable portion for packaging a first locate record command into DCW prefix parameter data, the first locate record command including first search and first seek arguments, a first intent count argument, a first transfer length factor argument, and a plurality of remaining arguments;

a second executable portion for embedding a plurality of truncated locate record commands in the DCW prefix parameter data as concatenations to the first locate record command, wherein:

each of the plurality of truncated locate record commands include a unique search argument, intent count argument, and transfer length factor argument, seek argument parameters for each of the plurality of truncated locate record commands are calculated by taking an offset from the first seek argument and the first search argument, applying the offset to each of the plurality of truncated locate record commands, and the plurality of remaining arguments are shared between the first locate record command and the plurality of truncated locate record commands; and a third executable portion for, if one of the plurality of remaining arguments of the first locate record command and one of the plurality of embedded truncated locate record commands differ, breaking an input/output (I/O) chain containing the first locate record command and the one of the plurality of embedded truncated locate record commands into two requests.

13. The computer program product of claim 12, further including a third executable portion for specifying a plurality of domains for each of the plurality of embedded truncated locate record commands as an array in the DCW prefix parameter data.

14. The computer program product of claim 13, further including a fourth executable portion for specifying a size of the array in the DCW prefix parameter data to indicate a number representative of the plurality of embedded truncated locate record commands.

15. The computer program product of claim 12, wherein each of the unique search arguments are 5 bytes in length, each of the unique intent count arguments are one byte in length, and each of the unique transfer length factor arguments are two bytes in length.

16. The computer program product of claim 12, wherein the plurality of remaining arguments include a locate record argument, a flag argument, an embedded channel command word (CCW) op code argument, and a sector number argument.

17. The computer program product of claim 12, further including a third executable portion for transmitting the DCW prefix parameter data in a DCW chain to a control unit for processing.

* * * * *